(12) United States Patent
Ogi et al.

(10) Patent No.: US 6,427,052 B1
(45) Date of Patent: Jul. 30, 2002

(54) EXPOSURE-CONDITION SETTING DEVICE FOR CAMERA

(75) Inventors: Mikio Ogi, Saitama; Masaaki Haga, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/853,585

(22) Filed: May 14, 2001

(30) Foreign Application Priority Data

May 15, 2000 (JP) .......................... 2000-142001

(51) Int. Cl.⁷ .................... G03B 7/00; G03B 17/18
(52) U.S. Cl. ............... 396/222; 396/223; 396/281; 396/299
(58) Field of Search ............... 396/222, 223, 396/281, 299, 297

(56) References Cited

U.S. PATENT DOCUMENTS

| | | | |
|---|---|---|---|
| 3,947,862 A | 3/1976 | Watanabe et al. | 396/223 |
| 4,067,033 A | 1/1978 | Urano et al. | 396/299 |
| 4,974,012 A | * 11/1990 | Ohsawa | 396/222 |
| 5,099,267 A | 3/1992 | Satou et al. | 396/222 |
| 6,122,451 A | 9/2000 | Ohsawa et al. | 396/223 X |

FOREIGN PATENT DOCUMENTS

| | | | | |
|---|---|---|---|---|
| JP | 403235928 A | * 10/1991 | | G03B/7/091 |
| JP | 407168238 A | * 7/1995 | | G03B/7/08 |

* cited by examiner

*Primary Examiner*—W. B. Perkey
(74) *Attorney, Agent, or Firm*—Greenblum & Bernstein, P.L.C.

(57) ABSTRACT

An exposure-condition setting device for a camera includes an Xv dial for setting an exposure compensation value, having a plurality of exposure compensation value indicia, the exposure compensation value indicia representing exposure compensation values; and an AEB dial provided coaxial to the Xv dial and relatively rotatable thereto, for setting an automatic exposure bracketing mode having at least one pair of range marks in the circumferential direction thereof, the pair of range marks representing an exposure compensation range in the automatic exposure bracketing mode when the automatic exposure bracketing mode is set by the AEB dial. An interval of the pair of range marks in the circumferential direction is determined so that the pair of range marks registers with a pair of exposure compensation value indicia on the Xv dial so as to indicate the exposure compensation range for the automatic exposure mode.

8 Claims, 4 Drawing Sheets

EXPOSURE-CONDITION SETTING DEVICE FOR CAMERA

BACKGROUND OF THE INVENTION

1. Field of the Invention

The present invention relates to an operation member for a camera, which is adapted to set an exposure compensation value (Xv) and an automatic exposure bracketing (AEB) mode.

2. Description of the Related Art

There is known a camera having an exposure compensating function to vary the correct exposure value estimated by the camera in accordance with photographing conditions and an automatic exposure bracketing (AEB) function to take continuous shots at automatically compensated exposure levels above or below the correct exposure value.

However, in the prior art, separate operation devices for compensating the exposure value and for setting the AEB mode are necessary, or the compensated exposure value and the set AEB mode are indicated at distant positions, or it is difficult for a user to understand the correlation between the compensated exposure vale and the AEB mode. In particular, upon taking shots at the AEB mode and at a compensated exposure value, it is difficult for a user to intuitively recognize the range of the exposure compensation at the AEB mode.

SUMMARY OF THE INVENTION

It is an object of the present invention to provide an operation member for a camera, in which the correlation between the compensated exposure value and the photographic range at the AEB mode can be easily understood, and the range of the exposure compensation can be easily and visually confirmed.

In order to achieve the above-mentioned object, an exposure-condition setting device for a camera is provided, including an Xv dial for setting an exposure compensation value, having a plurality of exposure compensation value indicia in the circumferential direction thereof, the exposure compensation value indicia representing exposure compensation values, one of which being set in accordance with one of a plurality of stop positions of the Xv dial; and an AEB dial provided coaxial to the Xv dial and relatively rotatable thereto, for setting an automatic exposure bracketing mode having at least one pair of range marks in the circumferential direction thereof, the pair of range marks representing an exposure compensation range in the automatic exposure bracketing mode when the automatic exposure bracketing mode is set by the AEB dial. An interval of the pair of range marks in the circumferential direction is determined so that the pair of range marks registers with a pair of exposure compensation value indicia on the Xv dial so as to indicate the exposure compensation range for the automatic exposure mode.

With this arrangement, upon taking photographic shots at the automatic exposure bracketing mode, the exposure compensation range set at the automatic exposure bracketing mode can be easily recognized even if the exposure has been compensated.

Preferably, the AEB dial is provided with a plurality of AEB mode indicia to set different exposure compensation ranges, wherein each of the pair of range marks corresponds to each of the AEB mode indicia.

In an embodiment, the pair of range marks include an overexposure range mark which represents the exposure compensation value indicia corresponding to an overexposure compensation value of the automatic exposure bracketing mode, and an underexposure range mark which represents the exposure compensation value indicia corresponding to an underexposure compensation value of the automatic exposure bracketing mode.

In an embodiment, the overexposure range marks and the underexposure range marks are spaced in opposite circumferential directions at a predetermined angular distance away from the AEB mode indicia.

One of the Xv dial and the AEB dial is provided with a circular operation portion and the other of Xv dial and the AEB dial is provided with an annular operation portion which surrounds the circular operation portion.

In an embodiment, the exposure-condition setting device further includes a stationary mark provided in the vicinity of the: Xv dial and the AEB dial; and a control device which sets the exposure compensation value corresponding to the exposure compensation value indicia which is registered with the stationary mark at one of the stop positions of the Xv dial, and sets the automatic exposure bracketing modes corresponding to the automatic exposure bracketing mode indicia which is registered with the stationary mark at one of the stop positions of the AEB dial.

Preferably, the exposure-condition setting device further includes a first click-stop mechanism which is adapted to stop the xv dial at one of the stop positions thereof corresponding to the exposure compensation value indicia, and a second click-stop mechanism which is adapted to stop the AEB dial at one of the stop positions thereof corresponding to the automatic exposure bracketing modes.

According to another aspect of the present invention, an operation member for a camera is provided, including a first rotary operation member, adapted to set an exposure compensation value, including a plurality of exposure compensation value indicia which represent exposure compensation values set in accordance with first stop positions of the first rotary operation member; and a second rotary operation member, adapted to set an automatic exposure bracketing mode, including a plurality of range marks which represent the exposure compensation ranges at the automatic exposure bracketing mode set in accordance with second stop positions of the second rotary operation member. The first and second rotary operation members are provided on the camera and relatively rotate about a common axis. The plurality of exposure compensation value indicia and the plurality of range marks are provided on the first rotary operation member and the second rotary operation member, respectively, at predetermined intervals in the circumferential direction, so that a circumferential position of the range marks corresponds to a circumferential position of the exposure compensation value indicia when the first rotary operation member and the second rotary operation member are stopped at the respective stop positions thereof.

The present disclosure relates to subject matter contained in Japanese Patent Application No.2000-142001 (filed on May 15, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
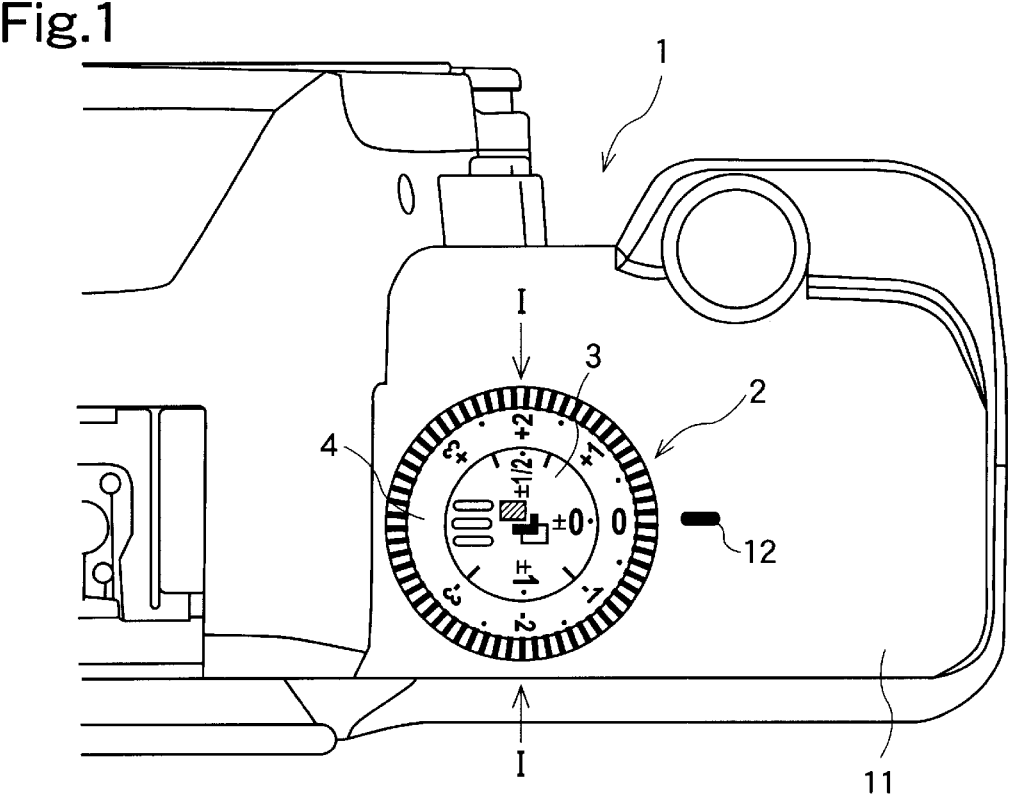
FIG. 1 is a plan view of a set dial according to the present invention.
Figure 2:
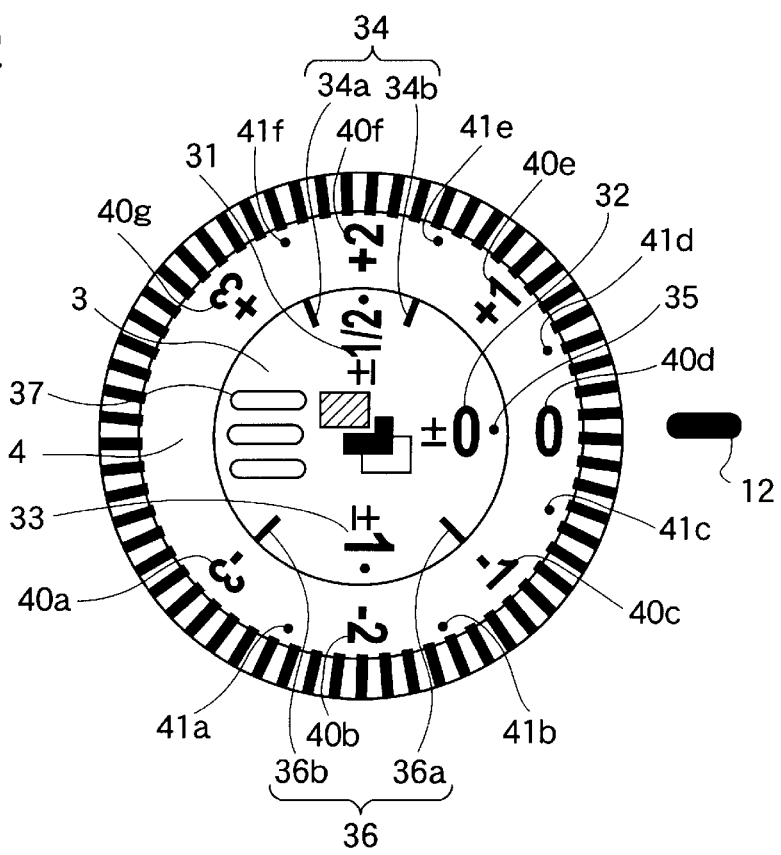
FIG. 2 is an enlarged plan view of a set dial shown in FIG. 1.

FIGS. 1 and 2 show plan views of a camera having a set dial (operation member/exposure-condition setting device) 2 to which the present invention is applied. The set dial 2 shown in FIG. 2 is provided on an upper decorative plate 11 of a camera body 1. A stationary mark 12 is provided in the vicinity of the set dial 2. The set dial 2 is provided with an AEB dial (second rotary operation member) 3 for setting the automatic exposure bracketing (AEB) modes, and an Xv dial (first rotary operation member) 4 for setting exposure compensation values (Xv). The operation portion of the AEB dial 3 is circular-shaped and the operation portion of the Xv dial 4 is annular-shaped to surround the operation portion of the AEB dial 3. The set dial 2 is in the form of a double rotary ring in which the AEB dial 3 and the Xv dial 4 are coaxial and independently rotatable.

The Xv dial 4 is provided on its surface with exposure compensation value indicia 40a, 40b, 40c, 40d, 40e, 40f, and 40g representing the exposure compensation values (EV) of −3, −2, −1, 0, +1, +2, +3, respectively, spaced in the circumferential direction at equi-angular intervals, and intermediate marks 41a, 41b, 41c, 41d, and 41f between the adjacent exposure compensation value indicia 40a through 40g. The intermediate marks 41a through 41f represent intermediate values of the exposure compensation values indicated by the exposure compensation value indicia 40a through 40g.

The Xv dial 4 is provided with a first click-stop mechanism in which the dial clicks at positions in which the exposure compensation value indicia 40a through 40g and the intermediate marks 41a through 41f are registered with the stationary mark 12. Consequently, the exposure compensation values corresponding to the exposure compensation value indicia 40a through 40g or the intermediate marks 41a through 41f can be set. A CPU (control device) provided in the camera body 1 controls the exposure so that the correct exposure value set at the automatic exposure mode or set by the user can be adjusted in accordance with the exposure compensation value set by the Xv dial 4 to carry out the exposure control at the adjusted exposure value.

The AEB dial 3 is provided on its surface with AEB mode indicia 31 and 33 having values of ±½ and ±1, respectively, spaced at equi-angular intervals with respect to an AEB neutral indicia 32 having the value of ±0. The AEB dial 3 is provided with a second click-stop mechanism in which the dial clicks at positions in which the AEB mode indicia 31 through 33 are registered with the stationary mark 12. Consequently, the AEB mode corresponding to the stationary mark 12 can be set in the CPU of the camera body. When the AEB mode indicia 31 (i.e., indicia of the ±½ mode), corresponds to the stationary mark 12, the ±½ mode is set, so that continuous shots can be taken at −0.5 EV compensation, 0 EV compensation, and +0.5 EV compensation. When the AEB mode indicia 33 (i.e., indicia of the ±1 mode) corresponds to the stationary mark 12, the ±1 mode is set, so that continuous shots can be taken at −1 EV compensation, 0 EV compensation, and +1 EV compensation. When the AEB neutral indicia 32 (i.e., indicia of ±0) corresponds to the stationary mark 12, the AEB mode is not set, so that only one shot can be taken at 0 EV compensation.

The AEB dial 3 is provided on its surface with range marks 34 and 36 which represent the ranges of the exposure compensation at the corresponding AEB mode indicia 31 and 33, by the indication of the Xv dial 4. The AEB dial 3 also is provided with a neutral mark 35 which indicates that the AEB mode is OFF.

The range marks 34 and 36 are provided with overexposure range marks 34a and 36a which represent the exposure compensation values of the overexposure level above the non-compensated exposure value, and underexposure range marks 34b and 36b which represent the exposure compensation values of the underexposure level below the non-compensated exposure value, respectively. The overexposure range mark 34a and the underexposure range mark 34b are spaced from the ±½ AEB mode indicia 31 in opposite directions at an angular distance identical to the angular distance of ½ EV of the Xv dial 4. The overexposure range mark 36a and the underexposure range mark 36b are spaced from the ±1 AEB mode indicia 33 in opposite directions at an angular distance identical to the angular distance of 1 EV of the Xv dial 4. Namely, the indication range of the Xv dial 4 between the overexposure range marks 34a, 36a and the underexposure marks 34b, 36b represent the range of the exposure compensation at the respective AEB mode.

The AEB dial 3 is provided on its surface with a finger engagement 37 which enables a user to easily rotate the AEB dial 3 by his or her finger engaging with the finger engagement.

When the AEB dial 3 an the Xv dial 4 are rotated to register desired AEB mode indicia and exposure compensation value with the stationary mark 12, the exposure range set by the AEB dial 3 can be visually confirmed through the indication of the XV dial 4.

Figure 3A:
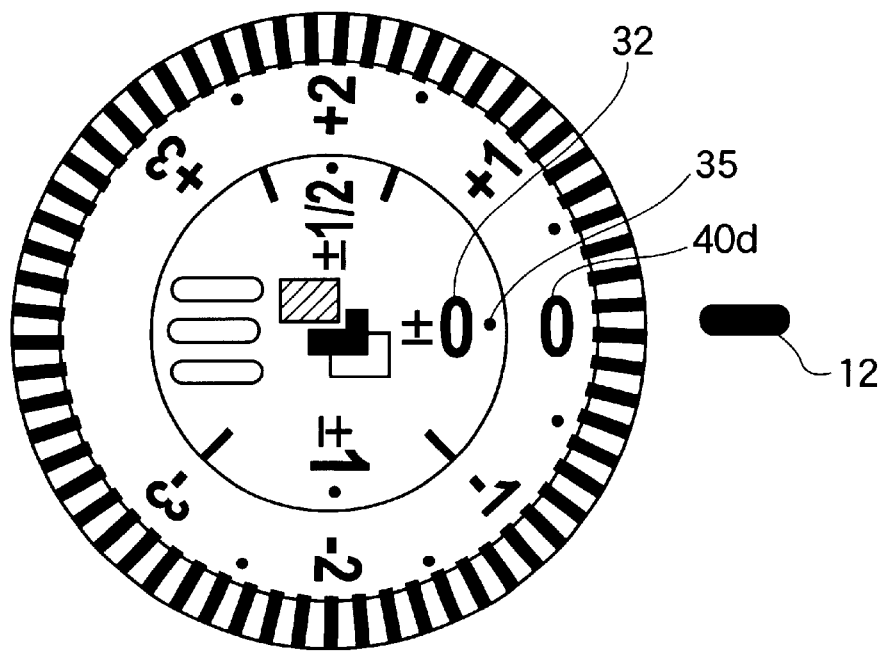
FIGS. 3A through 3D are explanatory views of the range of exposure compensation set by a set dial shown in FIG. 1; and, FIG. 4 is a sectional view taken along the line I—I in FIG. 1.

In the set dial 2 shown in FIG. 3A, the AEB neutral indicia 32 and the exposure compensation value indicia 40d (0 EV) correspond to the stationary mark 12 (i.e., AEB neutral indicia 32, the exposure compensation value indicia 40d and the stationary mark 12 are arranged in radial direction of the dials 3 and 4), and hence the exposure compensation value is set at 0 EV and the AEB mode is not set (OFF). Moreover, since the circumferential position of the neutral mark 35 corresponds to the circumferential position of the exposure compensation value indicia 40d (0 EV), the exposure compensation range is 0. In this state, a photographic shot is taken without exposure value compensation and without using the AEB mode.

Figure 3B:
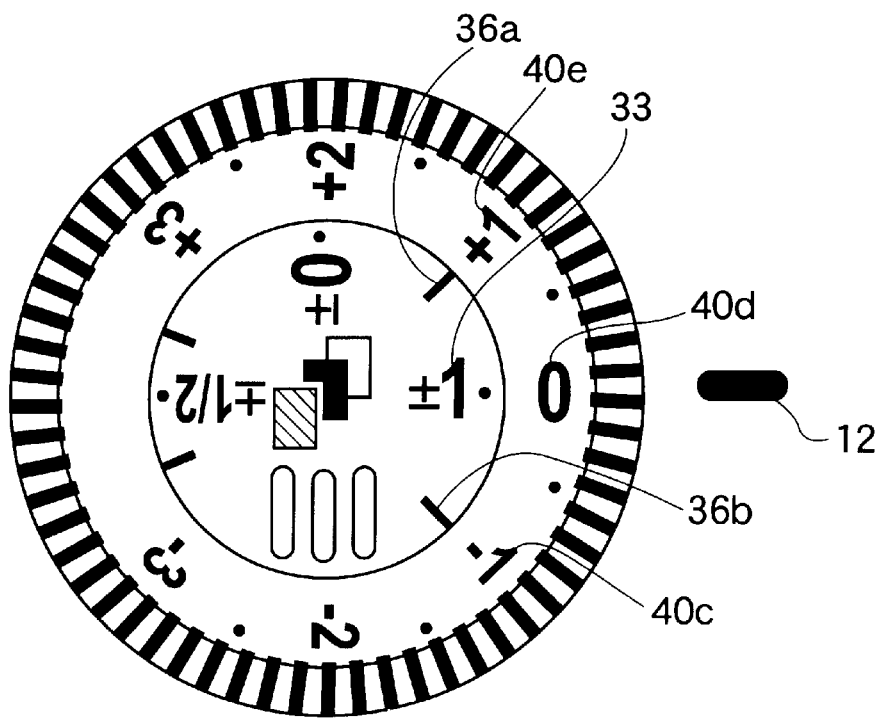

In the set dial 2 shown in FIG. 3B, the AEB mode indicia 33 and the exposure compensation value indicia 40d correspond to the stationary mark 12 (i.e., the AEB mode indicia 33, the exposure compensation value indicia 40d and the stationary mark 12 are arranged in radial direction of the dials 3 and 4), and hence the exposure compensation value is set at 0 EV and the AEB mode is set at ±1 mode. Moreover, since the circumferential position of the overexposure range mark 36a corresponds to the circumferential position of the exposure compensation value indicia 40e (+1 EV) and the circumferential position of the underexposure range mark 36b corresponds to the circumferential position of the exposure compensation value indicia 40c (−1 EV), shots at the AEB mode can be taken at the exposure compensation value range of −1 EV through +1 EV.

Figure 3C:
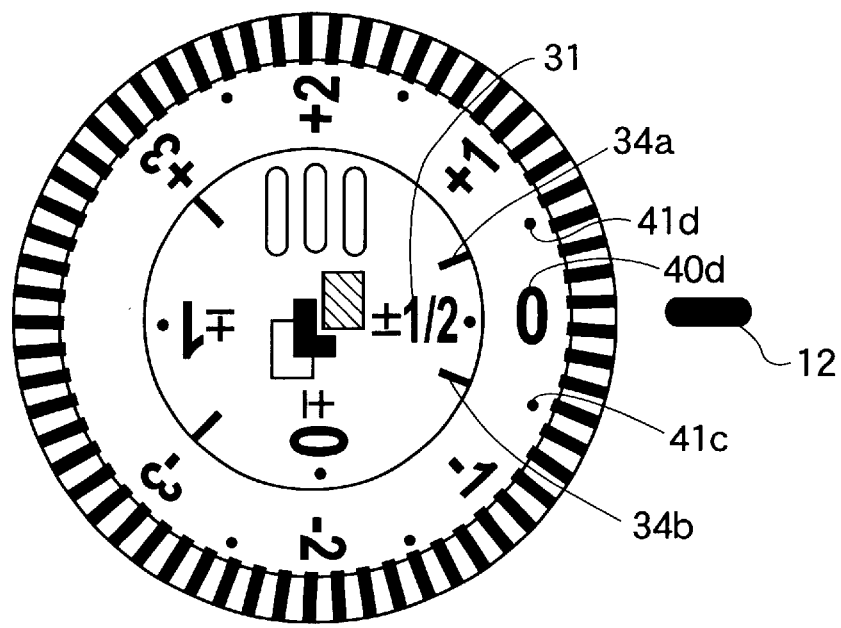

In the set dial 2 shown in FIG. 3C, since the AEB mode indicia 31 and the exposure compensation value indicia 40d correspond to the stationary mark 12 (i.e., the AEB mode indicia 31, the exposure compensation value indicia 40d and the stationary mark 12 are arranged in radial direction of the dials 3 and 4), the exposure compensation value is set at 0 EV and the AEB mode is set at ±½ mode. Moreover, since the circumferential position of the overexposure range mark 34*a* corresponds to the circumferential position of the intermediate mark 41*d* representing +0.5 EV, and the circumferential position of the underexposure range mark 34*b* corresponds to the circumferential position of the intermediate mark 41*c* representing −0.5 EV, shots at the AEB mode can be taken at the exposure compensation value range of −0.5 EV through +0.5 EV.

Figure 3D:
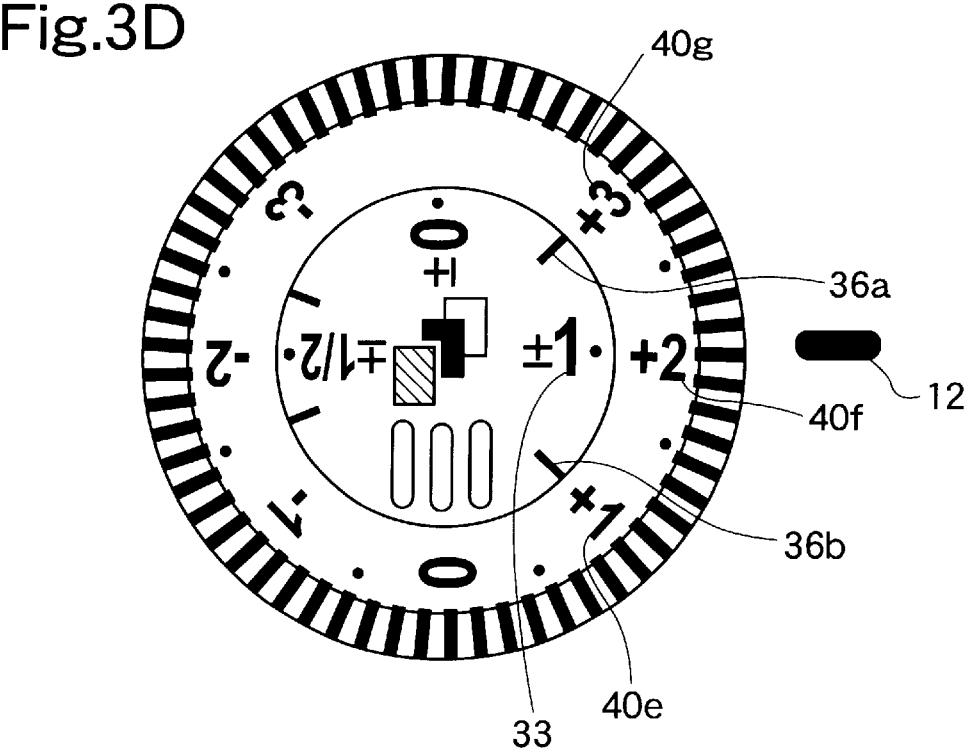

In the set dial 2 shown in FIG. 3D, the AEB mode indicia 33 and the exposure compensation value indicia 40*f* correspond to the stationary mark 12 (i.e., the AEB mode indicia 33, the exposure compensation value indicia 40*f* and the stationary mark 12 are arranged in radial direction of the dials 3 and 4), and hence the exposure compensation value is set at +2 EV and the AEB mode is set at ±1 mode. Moreover, since the circumferential position of overexposure range mark 36*a* corresponds to the circumferential position of the exposure compensation value indicia 40*g* (+3 EV) and the circumferential position of the underexposure range mark 36*b* corresponds to the circumferential position of the exposure compensation value indicia 40*e* (+1 EV), shots at the AEB mode can be taken at the exposure compensation value range of +1 EV through +3 EV.

As can be understood from the foregoing, the exposure compensation range is shown by the indication of the Xv dial 4 represented by the range marks 34 and 36 defined by the adjacent AEB mode indicia 31 and 33, with respect to the stationary mark 12, and hence it is possible for a user to easily recognize the exposure compensation range set at the AEB mode even if the exposure value has been compensated, as shown in FIG. 3D.

Figure 4:
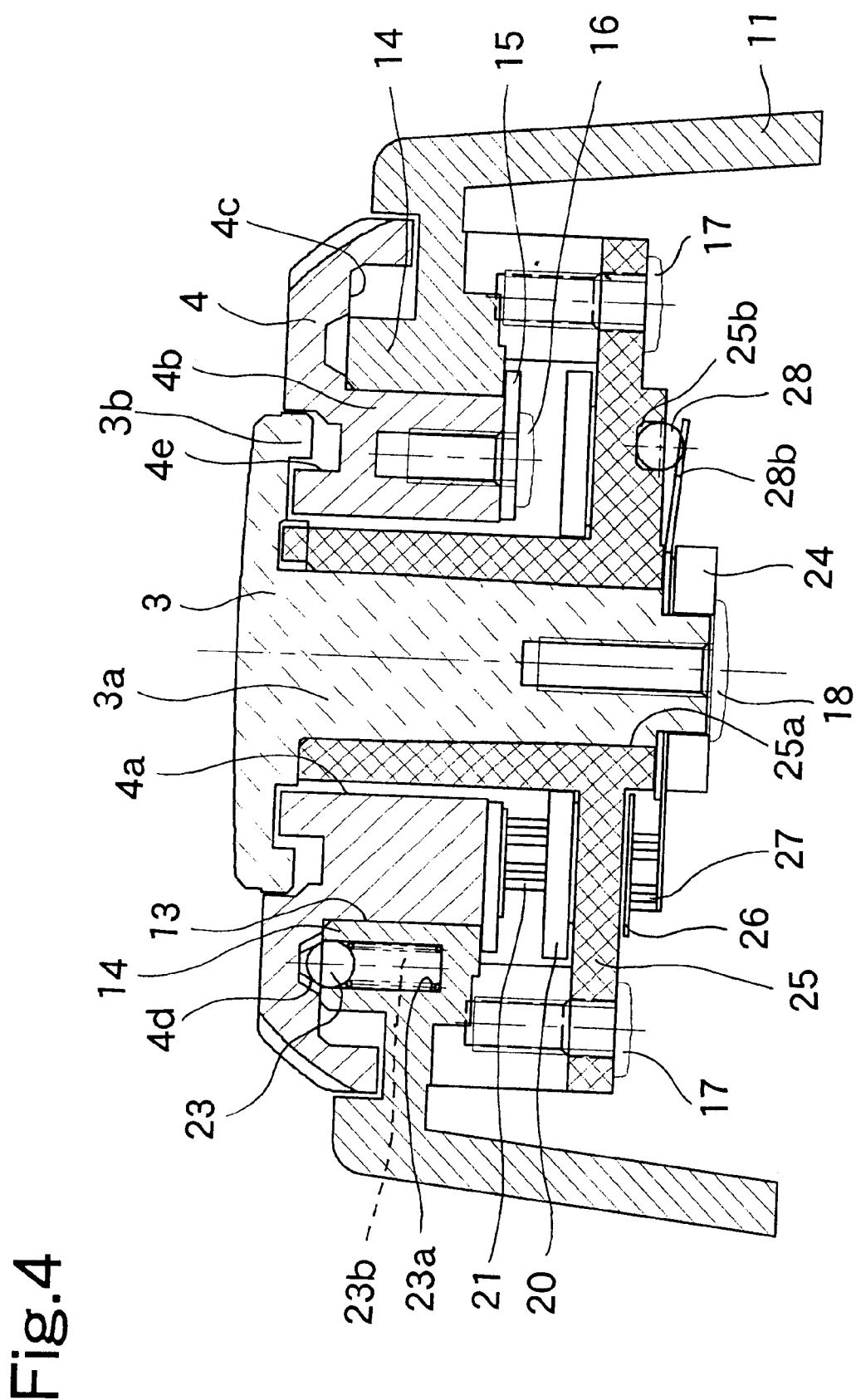

The structure of the set dial 2 will be discussed below with reference to FIG. 4 which is a sectional view taken along the line I—I shown in FIG. 1.

The Xv dial 4 is of an annular shape having a center shaft hole 4*a* and is provided on its rear surface with a cylindrical portion 4*b*, so that the set dial 4 can be rotatably supported in a shaft bearing hole 13 formed in the upper decorative plate 11, via the cylindrical portion 4*b*. The shaft bearing hole 13 is reinforced by a boss 14 formed on the upper decorative plate 11. An annular reinforcing plate 15 is secured to the bottom end of the cylindrical portion 4*b*, which extends through the shaft bearing hole 13 into the camera body 1, by a screw 16 to prevent the set dial from coming out. An Xv dial contact brush 21 which comes into contact with an Xv dial code plate 20 is attached to the reinforcing plate 15. The Xv dial contact brush 21 is provided with a plurality of contact pieces (not shown) that can be independently brought into slide contact with code portions (not shown) formed on the Xv dial code plate 20 when the Xv dial 4 is rotated. The contact pieces are connected to the CPU in the camera body 1 through a printed circuit board (not shown). The code portions with which the contact pieces are brought into contact are changed in accordance with the rotation of the Xv dial 4. Namely, the CPU in the camera body 1 detects a combination of codes, depending on the stop position of the Xv dial 4, to set the exposure compensation value.

In order to stop the Xv dial 4 at a position where the Xv dial contact brush 21 is in contact with a predetermined code portion, a click-stop mechanism is provided between the Xv dial 4 and the upper decorative plate 11. The Xv dial 4 is provided on an inner surface with an annular groove 4*c* in which the boss 14 is fitted. Click holes 4*d* are provided in the form of recesses in the annular groove 4*c* opposed to the upper surface portions of the Xv dial 4 which correspond to the exposure compensation value indicia 40*a* through 40*g* and the intermediate marks 41*a* through 41*f*. Note that only one of the click holes 4*d* is shown in FIG. 4.

The boss 14 which is fitted in the annular groove 4*c* is provided on its upper surface with a click ball receiving hole 23*a* in which a click ball 23 is received. The click ball 23 is continuously biased by a click spring 23*b* arranged in the bottom portion of the click ball receiving hole 23*a*, in a direction to engage the clickball 23 in one of the clickholes 4*d*. Consequently, when the Xv dial 4 is rotated, the click ball 23 is disengaged from the click hole 4*d* and the Xv dial 4 is click-stopped each time the click ball 23 is engaged in one of the click holes 4*d*. The click holes 4*d*, the click ball receiving hole 23*a*, the click spring 23*b*, and the click ball 123 constitute a first click-stop mechanism.

The AEB dial 3 is in the form of a cylinder having a shaft portion 3*a* extending downwards into the inside of the camera body 1. The AEB dial 3 is inserted in a bearing hole 25*a* of an AEB dial bearing 25 from the outside of the camera body 1, so that the AEB dial 3 is rotatably supported by the AEB dial baring 25. A rib 3*b* formed on the under surface of the top portion of the AEB dial 3 is fitted in an AEB fitting hole 4*e* formed in the upper surface of the Xv dial 4. The AEB dial bearing 25 is inserted in the shaft hole 4*a* of the Xv dial 4 from the inside of the camera body 1 and is secured to the upper decorative plate 11 by screws 17. A retainer plate 24 is secured by a screw 18 to the front end of the shaft portion 3*a* of the AEB dial 3 that extends through the bearing hole 25*a* into the camera body 1, so that the AEB dial contact brush 27 and the click leaf spring 28*b* are held between the retainer plate 24 and the front end of the shaft portion 3*a*. The AEB dial contact brush 27 is provided with a plurality of contact pieces (not shown) that can be independently brought into slide contact with code portions (not shown) formed on an AEB dial code plate 26 mounted to the bottom surface of the AEB dial bearing 25 when the AEB dial 3 is rotated. The contact pieces are connected to the CPU in the camera body 1 via a printed circuit board (not shown). The CPU in the camera body 1 detects a combination of codes depending on the stop position of the AEB dial 3 to thereby set the AEB mode.

In order to stop the AEB dial 3 at a position in which the AEB dial contact brush 27 is in contact with a predetermined code portion, a click-stop mechanism is provided between the AEB dial bearing 25 and the retainer plate 24.

The AEB dial bearing 25 is provided on its rear surface with a click hole 25*b*. A click ball 28 is provided between the click hole 25*b* and the click leaf spring 28*b*. The click ball 28 is continuously biased by a click leaf spring 28*b* in a direction to engage in the click hole 25*b*. The click leaf spring 28*b* is provided with a plurality of click grooves (not shown) spaced at a predetermined distance, corresponding to the AEB mode indicia 31 through 33 formed on the surface of the AEB dial 3. Consequently, when the AEB dial 3 is rotated, the click ball 28 is disengaged from the click grooves and the AEB dial 3 is click-stopped at a position in which one of the AEB mode indicia 31 through 33 corresponds to the stationary mark 12 each time the click ball 28 is engaged in the click groove. The click hole 25*b*, the click leaf spring 28*b*, and the click ball 28 constitute a second click-stop mechanism.

In the set dial 2, the operation portion of the AEB dial 3 is circular and the operation portion of the Xv dial 4 is annular so as to surround the operation portion of the AEB dial 3 in the illustrated embodiment. However, the present invention is not limited thereto. In an alternative embodiment, the operation portion of the Xv dial may be circular and the operation portion of the AEB dial may be annular to encircle the operation portion of the Xv dial.

As can be understood from the foregoing, according to the present invention, since the circumferential position of the range marks which represent the exposure compensation ranges at the AEB mode is provided on the AEB dial (second rotary operation member) 3, corresponding to the circumferential position of the exposure compensation value indicia provided on the Xv dial (first rotary operation member) 4, not only can the correlation between the set exposure compensation values and the AEB mode be easily recognized, but also the exposure compensation range set at the AEB mode can be easily and visually confirmed. Consequently, it is possible for a user to easily recognize the exposure compensation range set at the AEB mode even if the exposure value has been compensated.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An exposure-condition setting device for a camera comprising:

an Xv dial for setting an exposure compensation value, having a plurality of exposure compensation value indicia in the circumferential direction thereof, said exposure compensation value indicia representing exposure compensation values, one of which being set in accordance with one of a plurality of stop positions of said Xv dial; and an AEB dial provided coaxial to said Xv dial and relatively rotatable thereto, for setting an automatic exposure bracketing mode having at least one pair of range marks in the circumferential direction thereof, said at least one pair of range marks representing an exposure compensation range in the automatic exposure bracketing mode when said automatic exposure bracketing mode is set by said AEB dial;

wherein an interval of said at least one pair of range marks in the circumferential direction is determined so that said at least one pair of range marks registers with a pair of exposure compensation value indicia on said Xv dial so as to indicate the exposure compensation range for the automatic exposure bracketing mode.

2. The exposure-condition setting device for a camera according to claim 1, wherein said AEB dial is provided with a plurality of AEB mode indicia to set different exposure compensation ranges; and wherein each of said at least one pair of range marks corresponds to each of said AEB mode indicia.

3. The exposure-condition setting device for a camera according to claim 1, wherein said pair of range marks comprise an overexposure range mark which represents the exposure compensation value indicia corresponding to an overexposure compensation value of the automatic exposure bracketing mode, and an underexposure range mark which represents the exposure compensation value indicia corresponding to an underexposure compensation value of the automatic exposure bracketing mode.

4. The exposure-condition setting device for a camera according to claim 3, wherein said overexposure range marks and said underexposure range marks are spaced in opposite circumferential directions at a predetermined angular distance away from said AEB mode indicia.

5. The exposure-condition setting device for a camera according to claim 1, wherein one of said Xv dial and said AEB dial is provided with a circular operation portion and the other of said Xv dial and said AEB dial is provided with an annular operation portion which surrounds said circular operation portion.

6. The exposure-condition setting device for a camera according to claim 1, further comprising:

a stationary mark provided in the vicinity of said Xv dial and said AEB dial; and a control device which sets the exposure compensation value corresponding to said exposure compensation value indicia which is registered with said stationary mark at one of the stop positions of said Xv dial, and sets the automatic exposure bracketing mode corresponding to said automatic exposure bracketing mode indicia which is registered with said stationary mark at one of the stop positions of said AEB dial.

7. The exposure-condition setting device for a camera according to claim 1, further comprising:

a first click-stop mechanism which is adapted to stop said Xv dial at one of the stop positions thereof corresponding to said exposure compensation value indicia; and a second click-stop mechanism which is adapted to stop said AEB dial at one of the stop positions thereof corresponding to the automatic exposure bracketing modes.

8. An operation member for a camera comprising:

a first rotary operation member, adapted to set an exposure compensation value, including a plurality of exposure compensation value indicia which represent exposure compensation values set in accordance with first stop positions of said first rotary operation member; and a second rotary operation member, adapted to set an automatic exposure bracketing mode, including a plurality of range marks which represent the exposure compensation ranges at the automatic exposure bracketing mode set in accordance with second stop positions of said second rotary operation member; wherein said first and second rotary operation members are provided on said camera and relatively rotate about a common axis; and said plurality of exposure compensation value indicia and said plurality of range marks are provided on said first rotary operation member and said second rotary operation, member, respectively, at predetermined intervals in the circumferential direction, so that a circumferential position of said range marks corresponds to a circumferential position of said exposure compensation value indicia when said first rotary operation member and said second rotary operation member are stopped at the respective stop positions thereof.

* * * * *